United States Patent
Murata et al.

(10) Patent No.: US 12,202,327 B2
(45) Date of Patent: Jan. 21, 2025

(54) VEHICLE LOWER STRUCTURE

(71) Applicant: TOYOTA JIDOSHA KABUSHIKI KAISHA, Toyota (JP)

(72) Inventors: Soshiro Murata, Toyota (JP); Kazuki Ohtake, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 358 days.

(21) Appl. No.: 17/954,832

(22) Filed: Sep. 28, 2022

(65) Prior Publication Data

US 2023/0144276 A1 May 11, 2023

(30) Foreign Application Priority Data

Nov. 9, 2021 (JP) ................................ 2021-182839

(51) Int. Cl.
*B60K 1/04* (2019.01)
*B62D 25/20* (2006.01)

(52) U.S. Cl.
CPC ............. *B60K 1/04* (2013.01); *B62D 25/20* (2013.01); *B60K 2001/0438* (2013.01)

(58) Field of Classification Search
CPC .. B60R 3/00; B62D 25/20; B60K 1/04; B60K 2001/0438
USPC ....................................................... 180/68.5
See application file for complete search history.

(56) References Cited

U.S. PATENT DOCUMENTS

| 7,717,487 | B2 * | 5/2010 | Kurokawa | B60N 2/06 296/65.13 |
| 10,493,893 | B2 * | 12/2019 | Matsuoka | B60P 1/436 |
| 10,974,582 | B2 * | 4/2021 | Hara | G05D 1/021 |
| 10,994,795 | B1 * | 5/2021 | Perez | B60K 15/067 |
| 2009/0134687 | A1 * | 5/2009 | Kurokawa | B62D 25/20 296/63 |
| 2017/0182874 | A1 * | 6/2017 | Shimasaki | B62D 25/08 |
| 2019/0193620 | A1 | 6/2019 | Matsuoka et al. | |
| 2023/0144276 | A1 * | 5/2023 | Murata | B62D 25/20 180/68.5 |
| 2023/0249526 | A1 * | 8/2023 | Ohtake | B62D 25/025 |
| 2023/0256884 | A1 * | 8/2023 | Ohtake | B62D 25/20 414/522 |

FOREIGN PATENT DOCUMENTS

JP 2019-116112 A 7/2019

* cited by examiner

*Primary Examiner* — James A Shriver, II
*Assistant Examiner* — Hilary L Johns
(74) *Attorney, Agent, or Firm* — Dinsmore & Shohl LLP

(57) ABSTRACT

A vehicle lower structure, including: a base member provided under a floor of a vehicle; a pair of reinforcement members; a slope device accommodated above the base member and between the pair of reinforcement members; and a vehicle body floor, both the slope device and the vehicle body floor being fastened to each of a rear flange of a front reinforcement member and a front flange of a rear reinforcement member of respective pairs of the flanges of each of the pair of reinforcement members, and a first fastening portion being disposed so as not to contact the vehicle body floor, and a second fastening portion at which the vehicle body floor is fastened to the rear flange of the front reinforcement member and to the front flange of the rear reinforcement member being disposed so as not to contact the slope device.

4 Claims, 6 Drawing Sheets

VEHICLE LOWER STRUCTURE

CROSS-REFERENCE TO RELATED APPLICATION

This application is based on and claims priority under 35 USC 119 from Japanese Patent Application No. 2021-182839 filed on Nov. 9, 2021, the disclosure of which is incorporated by reference herein.

BACKGROUND

Technical Field

The present disclosure relates to a vehicle lower structure.

Related Art

Japanese Patent Application Laid-open No. 2019-116112 discloses a technique relating to a vehicle installed with a slope device. In brief, in this conventional technique, a floor panel at a vehicle upper side of a base frame is disposed so as to be spaced apart from the base frame, and a slope device capable of extending a slope plate toward a sidewalk or a road is installed in a gap between the base frame and the floor panel.

However, in this kind of conventional technique, if a load acting on the floor panel is directly transmitted to the slope device, operation of the slope device may become unstable, and there is room for improvement in this respect.

SUMMARY

In consideration of the above-described circumstances, an object of the present disclosure is to provide a vehicle lower structure capable of stabilizing the operation of a slope device by preventing or suppressing a load acting on the vehicle floor from being directly transmitted to a slope device.

A vehicle lower structure of a first aspect of the present disclosure includes: a base member provided under a floor of a vehicle; a pair of reinforcement members provided at a vehicle upper side, and at respective sides in a vehicle front-rear direction, of the base member, the pair of reinforcement members being disposed with a longitudinal direction thereof along a vehicle width direction, and each of the pair of reinforcement members being configured in a hat shape with a cross section that is open toward the vehicle upper side as viewed from the longitudinal direction, with both end parts of the hat shape in a front-rear direction of the vehicle being configured as a flange; a slope device accommodated above the base member and between the pair of reinforcement members, the slope device being configured to extend a slope plate outward from a side of the vehicle; and a vehicle body floor supported from a vehicle lower side by the pair of reinforcement members and configuring a floor surface of a vehicle cabin, and disposed at an interval toward the vehicle upper side relative to the slope device, both the slope device and the vehicle body floor being fastened to each of a rear flange of a front reinforcement member and a front flange of a rear reinforcement member of respective pairs of the flanges of each of the pair of reinforcement members, and a position at which the slope device is fastened and a position at which the vehicle body floor is fastened being configured at different positions, and a first fastening portion at which the slope device is fastened to the rear flange of the front reinforcement member and to the front flange of the rear reinforcement member being disposed so as not to contact the vehicle body floor, and a second fastening portion at which the vehicle body floor is fastened to the rear flange of the front reinforcement member and to the front flange of the rear reinforcement member being disposed so as not to contact the slope device.

According to the above-described configuration, a base member is provided below the floor of a vehicle, and a pair of reinforcement members are provided at a vehicle upper side, and at respective sides in the vehicle front-rear direction, of the base member, and are disposed with the vehicle width direction as their longitudinal direction. The reinforcement members are formed in a hat shape with a cross section that is open toward the vehicle upper side as viewed from the longitudinal direction, and both end parts thereof in a front-rear direction of the vehicle are configured as flanges. A slope device is accommodated at the vehicle upper side of the base member and between the pair of reinforcement members, and the slope device is capable of extending a slope plate outward from a side of the vehicle. Moreover, the pair of reinforcement members support a vehicle body floor, configuring the floor surface of the vehicle cabin, from a vehicle lower side, and the vehicle body floor is disposed at an interval at the vehicle upper side with respect to the slope device.

Here, both the slope device and the vehicle body floor are fastened to each of the rear flange of the front reinforcement member and the front flange of the rear reinforcement member of respective pairs of flanges of the pair of reinforcement members, and the position at which the slope device is fastened and the position at which the vehicle body floor is fastened are configured at different positions from each other. Moreover, a first fastening portion of the slope device to the rear flange of the front reinforcement member, and to the front flange of the rear reinforcement member, is arranged so as not to contact the vehicle body floor, and a second fastening portion of the vehicle body floor to the rear flange of the front reinforcement member, and to the front flange of the rear reinforcement member, is disposed so as not to contact the slope device. As a result, since direct transmission of a load acting on the vehicle floor to the slope device is prevented or suppressed, operation of the slope device can be stabilized.

A vehicle lower structure of a second aspect of the present disclosure is the configuration of the first aspect, in which the rear flange of the front reinforcement member is configured with a height position at a lower position in a vehicle vertical direction than a front flange of the front reinforcement member, and the front flange of the rear reinforcement member is configured with a height position at a lower position in the vehicle vertical direction than a rear flange of the rear reinforcement member.

According to the above-described configuration, a configuration in which first fastening portions of the slope device to the rear flange of the front reinforcement member, and to the front flange of the rear reinforcement member, do not contact the vehicle body floor can be implemented without providing a non-contact structure on a lower surface side of the vehicle body floor.

A vehicle lower structure of a third aspect of the present disclosure is the configuration of the first or second aspect, in which the base member includes a battery case configured to accommodate a battery.

According to the above-described configuration, in a vehicle provided with a battery case under the floor of the vehicle, a load acting on the vehicle body floor can be prevented or suppressed from being directly transmitted to a slope device disposed between the battery case and the vehicle body floor.

As described above, according to the vehicle lower structure of the present disclosure, by preventing or suppressing a load acting on the vehicle floor from being directly transmitted to a slope device, an effect of enabling operation of the slope device to be stabilized is achieved.

BRIEF DESCRIPTION OF THE DRAWINGS

Exemplary embodiments of the present disclosure will be described in detail based on the following figures, wherein.

DETAILED DESCRIPTION

Explanation follows regarding a vehicle lower structure according to an exemplary embodiment of the present disclosure, with reference to FIG. 1 to FIG. 6. In these drawings, the arrow FR illustrated as appropriate indicates the front side of the vehicle, the arrow UP indicates the upper side of the vehicle, and the arrow LH indicates the left side of the vehicle.

Configuration of Exemplary Embodiment

Figure 1:
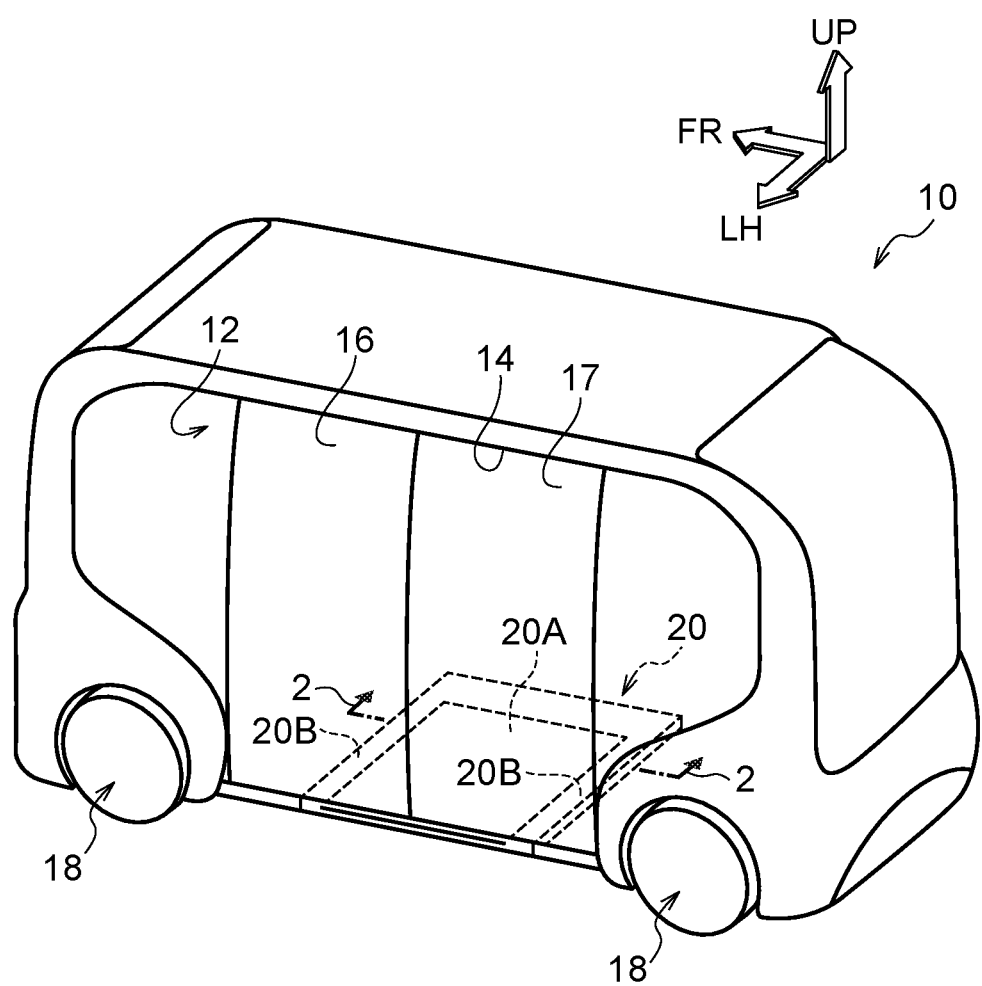
FIG. 1 is a perspective view illustrating a vehicle to which a vehicle lower structure according to an exemplary embodiment of the present disclosure has been applied.

In FIG. 1, a vehicle 10, to which a vehicle lower structure according to an exemplary embodiment of the present disclosure has been applied, is illustrated in perspective view. Here, the vehicle 10 illustrated in FIG. 1 is, for example, an electric vehicle that travels by autonomous driving, and is also capable of traveling by remote control. Vehicle drive units 18 are provided at both sides in the vehicle width direction at the front side and the rear side of the vehicle 10, and an in-wheel motor (not illustrated), for example, is incorporated in the vehicle drive unit 18.

As illustrated in FIG. 1, a door opening 14 is formed at an intermediate portion in a front-rear direction of the vehicle 10 at a left side portion 12 of the vehicle 10. The door opening 14 communicates the exterior of the vehicle cabin with the interior of the vehicle cabin, and is opened and closed by a pair of doors 16, 17. The pair of doors 16, 17 are slide doors that slide along the front-rear direction of the vehicle.

An electric slope device 20 is installed at a lower part of the vehicle 10. The slope device 20 is configured so as to be able to extend a slope plate 20A from a lower edge side of the door opening 14 outward from the side of the vehicle.

The slope device 20 includes the slope plate 20A, a pair of front and rear rails 20B (see FIG. 3) for guiding movement of the slope plate 20A, and a drive motor (not illustrated) for moving the slope plate 20A, and a jamming protection function is provided. The jamming protection function is a function for stopping movement of the slope plate 20A during a time of abnormality, such as in a case in which the slope plate 20A contacts a person or the like during deployment of the slope plate 20A. Since the basic configuration of the slope device 20 is well-known, detailed explanation thereof is omitted. Further, the slope plate 20A may be configured from a single piece or plural pieces.

Figure 2:
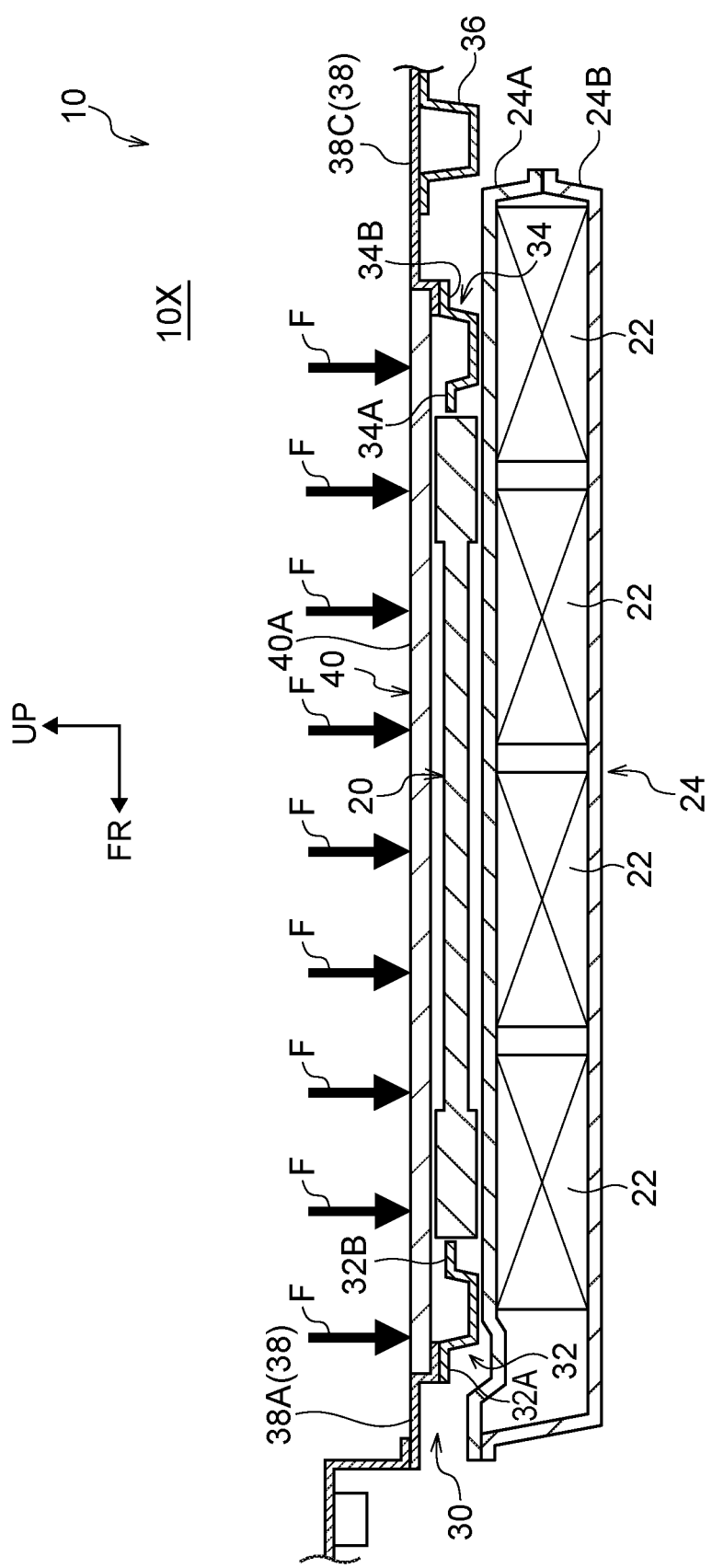
FIG. 2 is an enlarged, simplified cross-sectional view of a section taken along line 2-2 of FIG. 1.

In FIG. 2, an enlarged, simplified cross-sectional view of a section taken along line 2-2 of FIG. 1 is shown. In FIG. 2, the slope device 20 described above is illustrated as a single element for the sake of convenience. As illustrated in FIG. 2, a battery case 24 functioning as a base member is provided below the floor of the vehicle 10. The battery case 24 is a case body that accommodates a battery 22. As an example, the battery case 24 includes an upper case 24A configuring an upper portion thereof, and a lower case 24B disposed below the upper case 24A and forming an internal space together with the upper case 24A, and the upper case 24A and the lower case 24B are joined together. The battery case 24 is fixed to vehicle body component members (not shown).

Reinforcements 32, 34, functioning as a pair of iron (steel) strength members, are provided at a vehicle upper side, and on both sides in the vehicle front-rear direction, of the battery case 24. The pair of reinforcements 32, 34 are disposed with the vehicle width direction serving as a longitudinal direction thereof (see FIG. 3). Each of the pair of reinforcements 32, 34 may be configured by a single member, or may be configured as an integrated body by joining plural members connected in a longitudinal direction. The pair of reinforcements 32, 34 configure a portion of a body frame part 30. The body frame part 30 includes an iron (steel) reinforcement 36 disposed at a vehicle rear side of the pair of reinforcements 32, 34 with the vehicle width direction as a longitudinal direction.

In the following explanation, among the pair of reinforcements 32, 34, the reinforcement (front strength member) at the front side in the vehicle front-rear direction is referred to as the front reinforcement 32. The reinforcement (rear strength member) at the rear side among the pair of reinforcements 32, 34 in the vehicle front-rear direction is referred to as the rear reinforcement 34. In a case in which explanation is made collectively without distinguishing between the front reinforcement 32 and the rear reinforcement 34, these are referred to as a pair of reinforcements 32, 34.

The pair of reinforcements 32, 34 are formed in a hat shape with a cross section that is opened at a vehicle upper side as viewed along a longitudinal direction, and respective end parts in the vehicle front-rear direction are configured by flanges 32A, 32B, 34A, 34B. In the following explanation, among the flanges 32A, 32B of the front reinforcement 32, the flange at the front side in the vehicle front-rear direction is referred to as a front flange 32A, and the rearward flange of the flanges 32A, 32B of the front reinforcement 32 in the vehicle front-rear direction is referred to as a rear flange 32B. Similarly, of the flanges 34A, 34B of the rear reinforcement 34, the flange on the front side in the vehicle front-rear direction is referred to as a front flange 34A, and the rearward flange of the flanges 34A, 34B of the rear reinforcement 34 in the vehicle front-rear direction is referred to as a rear flange 34B.

Figure 3:
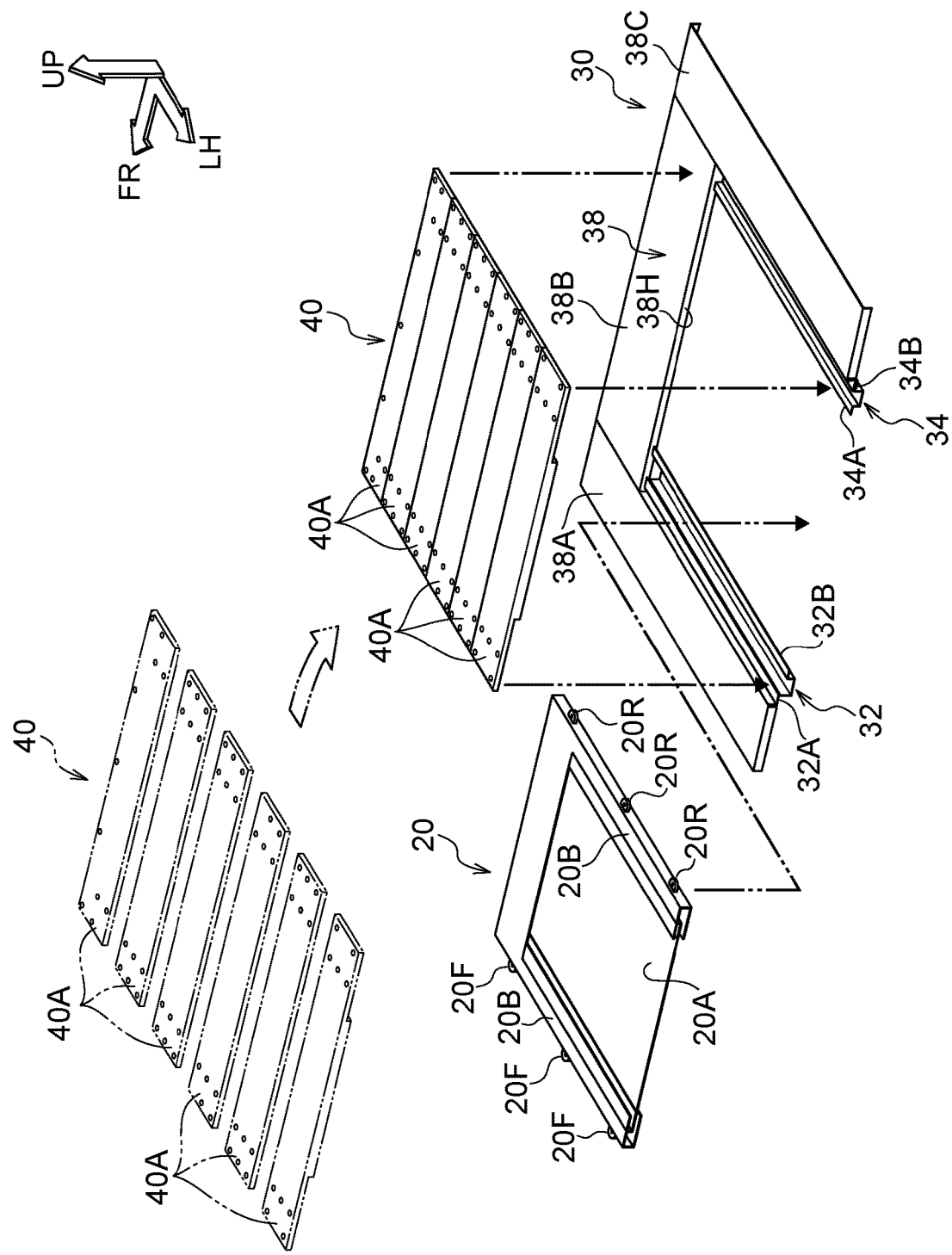
FIG. 3 is an exploded perspective view illustrating a simplified exploded view of a portion of the lower part of the vehicle of FIG. 1.

In FIG. 3, an exploded perspective view is shown of a simplified exploded view of a portion of a lower part of the vehicle 10 of FIG. 1. As illustrated in FIG. 2 and FIG. 3, the front flange 32A of the front reinforcement 32 and the rear flange 34B of the rear reinforcement 34 are joined to the underside of a panel body 38 of the iron (steel) body frame part 30.

As illustrated in FIG. 3, the panel body 38 includes plural panel materials 38A, 38B, 38C. Adjacent portions of the plural panel members 38A, 38B, 38C are joined together. At the panel body 38, a substantially rectangular penetration part 38H is formed that penetrates in a vehicle vertical direction, and this penetrating part 38H is open at the left side of the vehicle in a plan view of the vehicle. The front flange 32A of the front reinforcement 32 is joined to a forward portion of the peripheral edge of the penetration part 38H, and the rear flange 34B of the rear reinforcement 34 is joined to a rearward portion of the peripheral edge of the penetration part 38H. While not illustrated in FIG. 3, as illustrated in FIG. 2, a reinforcement 36 disposed further toward the vehicle rear side than the rear reinforcement 34 is also joined to the panel body 38.

The rear flange 32B of the front reinforcement 32 is configured at a position of lower height in the vehicle vertical direction than the front flange 32A of the front reinforcement 32. The front flange 34A of the rear reinforcement 34 is configured at a position of lower height in the vehicle vertical direction than the rear flange 34B of the rear reinforcement 34. The joining of the rear flange 32B of the front reinforcement 32 with another member, and the joining of the front flange 34A of the rear reinforcement 34 with another member, will be described below.

The slope device 20 described above is housed at a vehicle upper side of the battery case 24 and between the pair of reinforcements 32, 34. The pair of reinforcements 32, 34 support the vehicle body floor 40 configuring the floor surface of the vehicle cabin 10X from below the vehicle. Here, FIG. 2 schematically illustrates an equivalent distributed load, acting in a case in which a large number of occupants are standing on the vehicle body floor 40, with an arrow F. The rear flange 32B of the front reinforcement 32 and the front flange 34A of the rear reinforcement 34 are spaced apart from the bottom surface of the vehicle body floor 40 toward a lower side of the vehicle. The vehicle body floor 40 is disposed at an interval at the vehicle upper side with respect to the slope device 20. Here, in the case of a state in which the vehicle body floor 40 has been removed, the slope device 20 is detachable.

As illustrated in FIG. 3, the vehicle body floor 40 is configured by plural floor component members 40A, as an example. The floor component 40A is an extruded material made of an aluminum alloy, is hollow (see FIG. 5 and FIG. 6), and is formed in an elongated rectangular shape in plan view. The extrusion direction at the time of molding of the floor component 40A is the same direction as the longitudinal direction of the floor component 40A. In addition, in FIG. 2 and FIG. 3, illustration of a hollow part of the hollow floor component 40A is omitted in order to simplify the drawings. As illustrated in FIG. 3, the plural floor components 40A are each disposed with the vehicle front-rear direction as their longitudinal direction, and are joined to the body frame part 30 so as to occlude the penetration part 38H of the panel body 38 while being juxtaposed in the vehicle width direction. The plural floor component members 40A are detachable from the body frame part 30.

Figure 4:
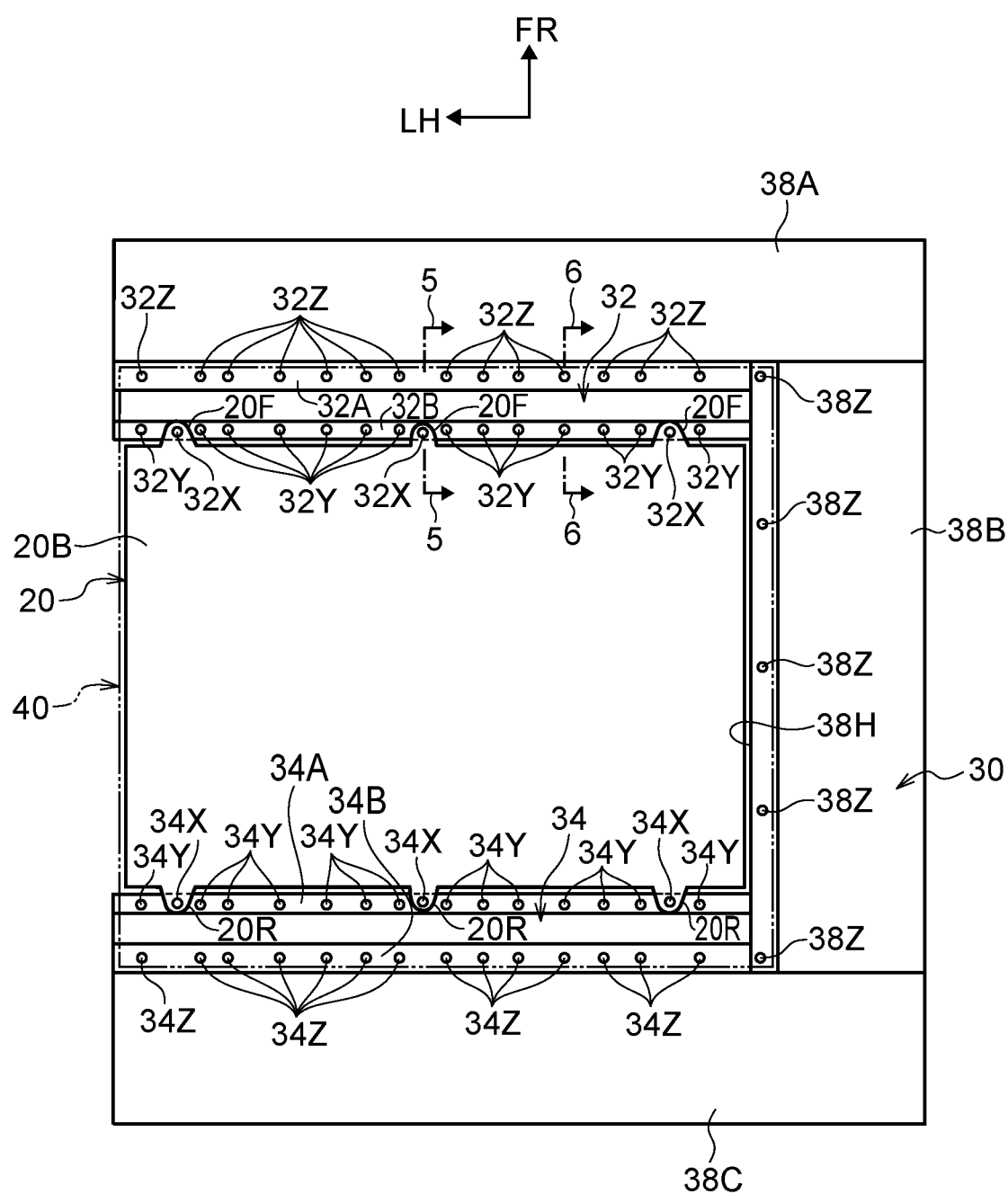
FIG. 4 is a simplified plan view illustrating a state in which the vehicle body floor is removed from the lower part of the vehicle illustrated in FIG. 1 to an extent corresponding to the illustration of FIG. 3, as viewed from a vehicle upper side.

In FIG. 4, a simplified plan view is shown of a state in which the vehicle body floor 40 is removed from the lower part of the vehicle 10 illustrated in FIG. 1 to an extent corresponding to the illustration of FIG. 3, as viewed from a vehicle upper side. In FIG. 4, the outline of the vehicle body floor 40 in a case in which the vehicle body floor 40 is in place is illustrated in a simplified manner by a two-dot chain line, and the slope device 20 is illustrated as a single element for simplicity. Moreover, reference numerals 32Y, 32Z, 34Y, 34Z, 38Z are assigned to positions at which the vehicle body floor 40 is fastened at the body frame part 30, and reference numerals 32X, 34X are assigned to positions at which the slope device 20 is fastened at the body frame part 30. To explain further, the circles marked with the reference numerals 32X, 32Y, 32Z, 34X, 34Y, 34Z, 38Z in FIG. 4 can be regarded as positions at which fasteners are disposed when viewed from a vehicle upper side.

Figure 5:
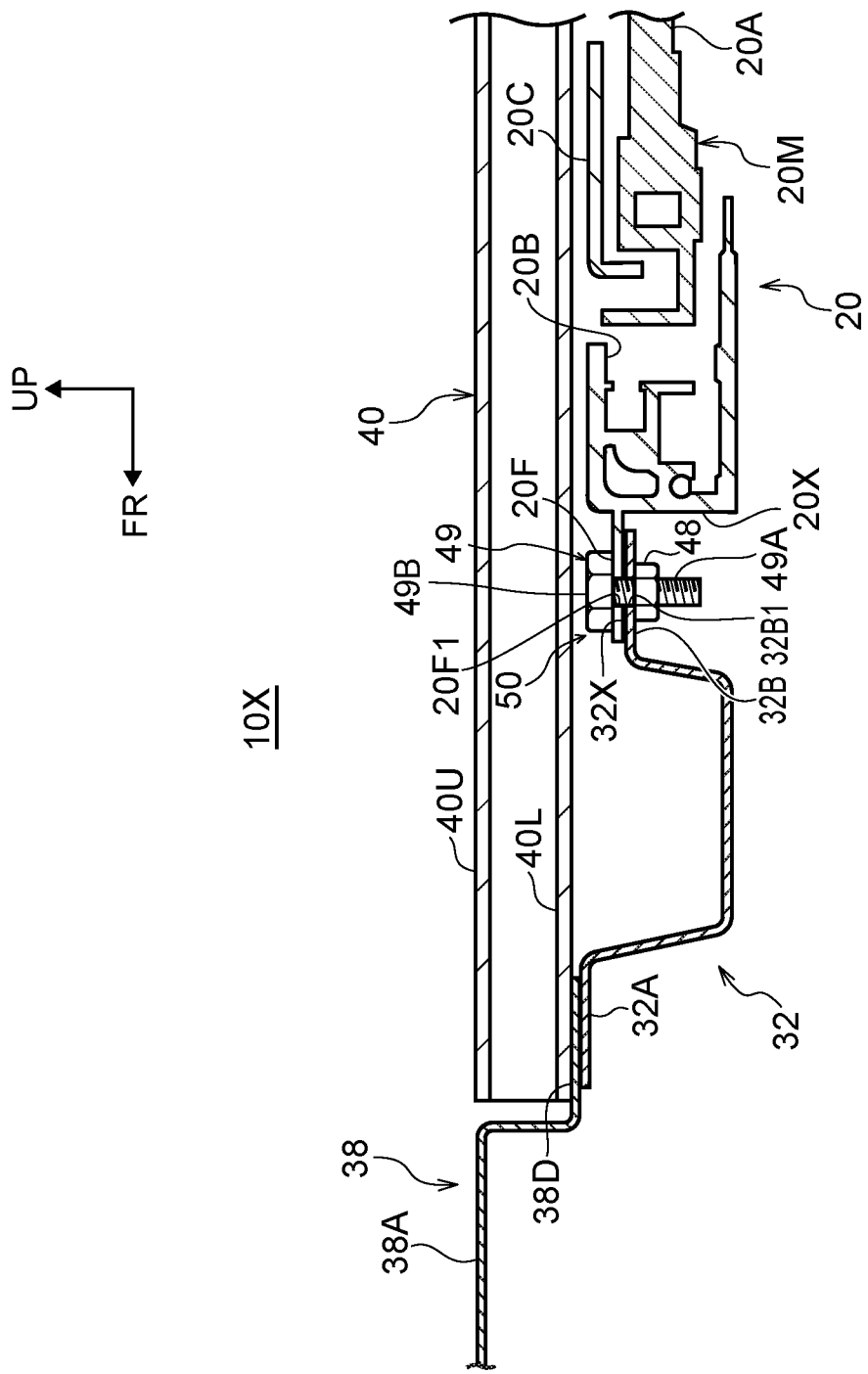
FIG. 5 is an enlarged cross-sectional view illustrating a state in which a lower part of the vehicle of FIG. 1 is cut at a position corresponding to line 5-5 of FIG. 4.
Figure 6:
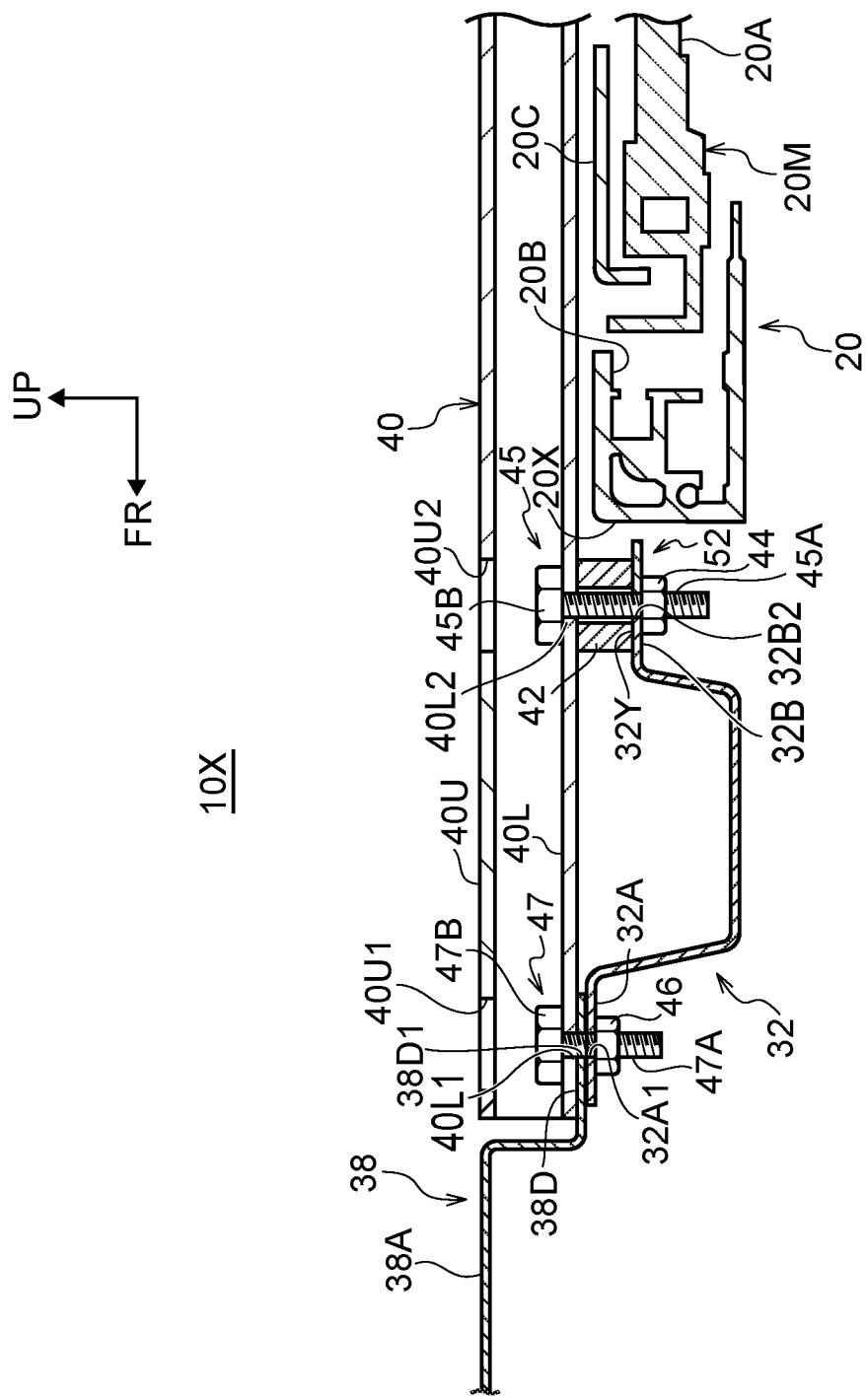
FIG. 6 is an enlarged cross-sectional view illustrating a state in which a lower part of the vehicle of FIG. 1 is cut at a position corresponding to line 6-6 of FIG. 4.

Further, in FIG. 5, a cross-sectional view is shown of a state in which the lower part of the vehicle 10 of FIG. 1 is cut at a position corresponding to line 5-5 in FIG. 4 and enlarged, and in FIG. 6, a cross-sectional view is shown of a state in which the lower part of the vehicle 10 of FIG. 1 is cut at a position corresponding to line 6-6 in FIG. 4 and enlarged. FIG. 5 and FIG. 6 illustrate the slope device 20 in a simplified state and, for example, a movable body 20M is illustrated in a state in which it is integrated with the slope plate 20A and a member attached to a front end side thereof in the vehicle front-rear direction for the sake of convenience. Further, a member (not illustrated) such as a pulley is disposed between the moving body 20M and the rail 20B. Incidentally, side guards 20C are provided at upper portions of both end sides of the movable body 20M in the vehicle front-rear direction, and these side guards 20C are arranged in a vertical wall shape by rotation thereof 90 degrees around a vehicle width direction axis during use of the slope device 20.

As illustrated in FIG. 4 to FIG. 6, both the slope device 20 and the vehicle body floor 40 are fastened to each of the rear flange 32B of the front reinforcement 32 and the front flange 34A of the rear reinforcement 34, and the positions 32X, 34X (see FIG. 4) at which the slope device 20 is fastened and the positions 32Y, 34Y (see FIG. 4) at which the vehicle body floor 40 is fastened are configured at different positions from each other. Hereinafter, explanation follows regarding these configurations and their peripheral configurations.

As illustrated in FIG. 4, from a front end side of the slope device 20 in the vehicle front-rear direction, plural front side projections 20F project toward a front side of the vehicle. Plural rear side projections 20R project toward a rear side of the vehicle from a rear end side of the slope device 20 in the vehicle front-rear direction. As an example, the front side projections 20F and the rear side projections 20R are configured at portions near respective ends in the vehicle width direction at front and rear end sides of the slope device 20 and at an intermediate portion in the vehicle width direction at front and rear end sides of the slope device 20.

As illustrated in FIG. 4 and FIG. 5, the front side projections 20F of the slope device 20 are overlaid from the vehicle upper side and fastened to the rear flange 32B of the front reinforcement 32. As illustrated in FIG. 5, a bolt insertion hole 20F1 is formed through the front side projection 20F. A bolt insertion hole 32B1 is formed in a position corresponding to the bolt insertion hole 20F1 in the rear flange 32B of the front reinforcement 32 through the rear flange 32B. A weld nut 48 is fixed in advance to an outer peripheral portion of the bolt insertion hole 32B1 at a lower surface of the rear flange 32B of the front reinforcement 32. A shaft 49A of a bolt 49 that penetrates the bolt insertion holes 20F1, 32B1 from a vehicle upper side, is screwed into the weld nut 48. As a result, the front side projection 20F of the slope device 20 and the rear flange 32B of the front reinforcement 32 are sandwiched and fastened between a head section 49B of the bolt 49 and the weld nut 48. A space is provided between the head portion 49B of the bolt 49 and the lower surface of the vehicle body floor 40.

As illustrated in FIG. 4, the rear side projections 20R of the slope device 20 are overlaid from the vehicle upper side and fastened to the front flange 34A of the rear reinforcement 34. The fastening configuration between the rear side projection 20R of the slope device 20 and the front flange 34A of the rear reinforcement 34 is substantially the same as the fastening configuration between the front side projection 20F of the slope device 20 and the rear flange 32B of the front reinforcement 32 illustrated in FIG. 5, inverted in the front-rear direction. As described above, the first fastening portion 50 of the slope device 20 to the rear flange 32B of the front reinforcement 32, and to the front flange 34A of the rear reinforcement 34, illustrated in FIG. 4 (refer to FIG. 5; a cross-sectional view of a fastening portion between the slope device 20 and the front flange 34A of the rear reinforcement 34 is not illustrated) is disposed so as not to contact the vehicle body floor 40 illustrated in FIG. 5.

As illustrated in FIG. 4 and FIG. 6, the front portion of the vehicle body floor 40 in the vehicle front-rear direction is fastened to the front flange 32A and the rear flange 32B of the front reinforcement 32.

As illustrated in FIG. 6, a bolt insertion hole 32A1 is formed through the front flange 32A of the front reinforcement 32. A weld nut 46 is fixed in advance to an outer peripheral portion of the bolt insertion hole 32A1 at a lower surface of the front flange 32A of the front reinforcement 32. A bolt insertion hole 38D1 is formed through an overlapping portion 38D of the panel body 38 that overlaps with the front flange 32A of the front reinforcement 32. Moreover, a bolt insertion hole 40L1 is formed through a lower wall 40L of the vehicle body floor 40 at a position corresponding to the bolt insertion hole 38D1. A work hole 40U1 with a larger diameter than the bolt insertion hole 40L1 is formed through an upper wall 40U of the vehicle body floor 40 at a vehicle upper side of the bolt insertion hole 40L1. The work hole 40U1 is dimensioned so as to allow a bolt 47 to pass therethrough. A shaft 47A of the bolt 47 penetrates the bolt insertion holes 40L1, 38D1, 32A1 from the vehicle upper side and is screwed into the weld nut 46. As a result, the lower wall 40L of the vehicle body floor 40, the overlapping portion 38D of the panel body 38, and the front flange 32A of the front reinforcement 32 are sandwiched and fastened between a head section 47B of the bolt 47 and the weld nut 46.

Further, a bolt insertion hole 32B2 is formed through the rear flange 32B of the front reinforcement 32. A weld nut 44 is fixed in advance to an outer peripheral portion of the bolt insertion hole 32B2 at a lower surface of the rear flange 32B of the front reinforcement 32. A metallic cylindrical collar 42 is interposed coaxially with the weld nut 44 between the rear flange 32B of the front reinforcement 32 and the lower wall 40L of the vehicle body floor 40. As an example, the collar 42 is fixed in advance to the rear flange 32B of the front reinforcement 32.

A bolt insertion hole 40L2 is formed in the lower wall 40L of the vehicle body floor 40 at a position corresponding to the bolt insertion hole 32B2 in the rear flange 32B of the front reinforcement 32. A work hole 40U2 with a larger diameter than the bolt insertion hole 40L2 is formed through the upper wall 40U of the vehicle body floor 40 at a vehicle upper side of the bolt insertion hole 40L2. The working hole 40U2 is dimensioned so as to allow a bolt 45 to pass therethrough. A shaft 45A of the bolt 45 penetrates the bolt insertion hole 40L2, the collar 42, and the bolt insertion hole 32B2 from the vehicle upper side, and is screwed into the weld nut 44. As a result, the lower wall 40L of the vehicle body floor 40, the collar 42, and the rear flange 32B of the front reinforcement 32 are sandwiched and fastened between a head 45B of the bolt 45 and the weld nut 44. The weld nut 44, the rear flange 32B of the front reinforcement 32, and the collar 42 are spaced apart from the front face 20X of the slope device 20 in the vehicle front-rear direction.

The rear portion in the vehicle front-rear direction of the vehicle body floor 40 illustrated by the two-dot chain line in FIG. 4, is fastened to the front flange 34A and the rear flange 34B of the rear reinforcement 34. The fastening configuration between the rear portion of the vehicle body floor 40 in the vehicle front-rear direction and the front flange 34A and the rear flange 34B of the rear reinforcement 34 is substantially the same as the fastening configuration between the front portion of the vehicle body floor in the vehicle front-rear direction and the front flange 32A and the rear flange 32B of the front reinforcement 32 illustrated in FIG. 6, inverted in the front-rear direction. As above, a second fastening portion 52 of the vehicle body floor 40 illustrated by the two-dot chain line in FIG. 4 to the rear flange 32B of the front reinforcement 32, and to the front flange 34A of the rear reinforcement 34 (refer to FIG. 6; a cross-sectional view of the fastening portion between the vehicle body floor 40 and the front flange 34A of the rear reinforcement 34 is not shown in the drawings) is disposed so as not to be in contact with the slope device 20.

The weld nuts 44, 46, 48 and the bolts 45, 47, 49 illustrated in FIG. 5 and FIG. 6 are elements that are broadly understood to be fasteners. While detailed explanation is omitted, as illustrated in FIG. 4, as an example, an end portion of the vehicle right side of the vehicle body floor 40 illustrated by the two-dot chain line is fastened at plural positions (positions indicated by reference numeral 38Z) to a vehicle right side portion at a peripheral edge portion of the penetration part 38H of the panel body 38.

Mechanism and Effect of Exemplary Embodiment

Next, explanation follows regarding the mechanism and effect of the above-described exemplary embodiment.

As illustrated in FIG. 2, the pair of reinforcements 32, 34 support the vehicle body floor 40 from the vehicle lower side, and the vehicle body floor 40 is disposed at an interval at the vehicle upper side with respect to the slope device 20. As illustrated in FIG. 4 to FIG. 6, both the slope device 20 and the vehicle body floor 40 are fastened to the rear flange 32B of the front reinforcement 32 and the front flange 34A of the rear reinforcement 34, respectively, and the positions 32X, 34X (see FIG. 4) at which the slope device 20 is fastened and the positions 32Y, 34Y (see FIG. 4) at which the vehicle body floor 40 is fastened are configured at different positions from each other. Moreover, the first fastening portions 50 (see FIG. 5) of the slope device 20 to the rear flange 32B of the front reinforcement 32 and to the front flange 34A of the rear reinforcement 34 are disposed so as not to contact the vehicle body floor 40, and the second fastening portions 52 (see FIG. 6) of the vehicle body floor 40 to the rear flange 32B of the front reinforcement 32 and to the front flange 34A of the rear reinforcement 34 are disposed so as not to contact the slope device 20. This enables a load acting on the vehicle body floor 40 to be prevented or suppressed from being directly transmitted to the slope device 20, which enables operation of the slope device 20 to be stabilized.

To explain further, in the configuration of the present exemplary embodiment, even in a case in which a large load acts on the vehicle body floor 40 in the vehicle vertical direction, this load is only transmitted to the slope device 20 via members such as the collar 42 and the pair of reinforcements 32, 34. This prevents a large input from being directly applied to the rail 20B (see FIG. 5 and FIG. 6) of the slope device 20, which enables an increase in sliding resistance (occurrence of an abnormality in sliding resistance) during deployment of the slope plate 20A to be suppressed. This enables a reduction in erroneous determination regarding an abnormality in sliding resistance during deployment of the slope plate 20A, and it is possible to prevent or effectively suppress the occurrence of a situation in which the operation of the slope device 20 is stopped by the jamming protection function based on an erroneous determination.

Moreover, in the present exemplary embodiment, the rear flange 32B of the front reinforcement 32 is set at a position that is lower in height than the front flange 32A of the front reinforcement 32 in the vehicle vertical direction, and as illustrated in FIG. 2, the front flange 34A of the rear reinforcement 34 is set at a position lower in height than the rear flange 34B of the rear reinforcement 34 in the vehicle vertical direction. As a result, a configuration in which the first fastening portion 50 (see FIG. 5) of the slope device 20 to the rear flange 32B of the front reinforcement 32 and to the front flange 34A of the rear reinforcement 34 do not come into contact with the vehicle body floor 40 can be implemented without providing a non-contact structure on the lower surface side of the vehicle body floor 40.

As described above, according to the vehicle lower structure of the present exemplary embodiment, by preventing or suppressing a load acting on the vehicle body floor 40 from being directly transmitted to the slope device 20, operation of the slope device 20 can be stabilized.

In the present exemplary embodiment, as illustrated in FIG. 4 to FIG. 6, in addition to employing a configuration in which both the slope device 20 and the vehicle body floor 40 are fastened to each of the rear flange 32B of the front reinforcement 32 and the front flange 34A of the rear reinforcement 34, since a configuration that prevents a load acting on the vehicle body floor 40 from being directly transmitted to the slope device 20 has been adopted, as illustrated in FIG. 4, the fastening pitch relative to the pair of reinforcements 32, 34 at the vehicle body floor 40 can be reduced. Further, by reducing the fastening pitch, even in a case in which a load acts in the vehicle vertical direction on the vehicle body floor 40 illustrated in FIG. 2, such as in a case in which the vehicle 10 (see FIG. 1) during travel has passed over a protrusion, deflection of the vehicle body floor 40 can be reduced. As a result, direct or indirect contact of the vehicle body floor 40 with the slope device 20 and the battery case 24 can be prevented or effectively suppressed.

Supplementary Explanation of Exemplary Embodiments

As a modified example of the above-described exemplary embodiment, a configuration may be adopted in which the height positions in the vehicle vertical direction of the pair of flanges of the pair of reinforcements serving as the pair of strength members are aligned, and a non-contact concave structure is provided at a lower surface side of the vehicle body floor so as to prevent a first fastening portion of the slope device to the rear flange of the front reinforcement (front strength member) and to the front flange of the rear reinforcement (rear strength member) from contacting the vehicle body floor.

Although explanation has been given regarding an example of a case in which the base member is the battery case 24 in the above-described exemplary embodiment, the base member may be a base frame that accommodates a battery (for example, a base frame such as that illustrated in Japanese Patent Application Laid-open No. 2019-116112), or a base frame that does not accommodate a battery may be used.

As a modified example of the above-described exemplary embodiments, a bracket made of a steel plate may be provided instead of the collar 42 illustrated in FIG. 6.

As a modified example of the above-described exemplary embodiments, the vehicle body floor may be, for example, a press-molded aluminum alloy. Further, the vehicle body floor may be configured of a single member.

The above-described exemplary embodiments and the plural modified examples described above may be implemented in appropriate combinations.

Although examples of the present disclosure have been described above, the present disclosure is not limited to the foregoing description and it will be apparent that various other modifications may be implemented within a range not departing from the gist of the present disclosure.

What is claimed is:

1. A vehicle lower structure, comprising:
   a base member provided under a floor of a vehicle;
   a pair of reinforcement members provided at a vehicle upper side, and at respective sides in a vehicle front-rear direction, of the base member, the pair of reinforcement members being disposed with a longitudinal direction thereof along a vehicle width direction, and each of the pair of reinforcement members being configured in a hat shape with a cross section that is open toward the vehicle upper side as viewed from the longitudinal direction, with both end parts of the hat shape in a front-rear direction of the vehicle being configured as a flange;
   a slope device accommodated above the base member and between the pair of reinforcement members, the slope device being configured to extend a slope plate outward from a side of the vehicle; and
   a vehicle body floor supported from a vehicle lower side by the pair of reinforcement members and configuring a floor surface of a vehicle cabin, and disposed at an interval toward the vehicle upper side relative to the slope device,
   both the slope device and the vehicle body floor being fastened to each of a rear flange of a front reinforcement member and a front flange of a rear reinforcement member of respective pairs of the flanges of each of the pair of reinforcement members, and a position at which the slope device is fastened and a position at which the vehicle body floor is fastened being configured at different positions, and
   a first fastening portion at which the slope device is fastened to the rear flange of the front reinforcement member and to the front flange of the rear reinforcement member being disposed so as not to contact the vehicle body floor, and a second fastening portion at which the vehicle body floor is fastened to the rear flange of the front reinforcement member and to the front flange of the rear reinforcement member being disposed so as not to contact the slope device.

2. The vehicle lower structure recited in claim 1, wherein:
the rear flange of the front reinforcement member is configured with a height position at a lower position in a vehicle vertical direction than a front flange of the front reinforcement member, and
the front flange of the rear reinforcement member is configured with a height position at a lower position in the vehicle vertical direction than a rear flange of the rear reinforcement member.

3. The vehicle lower structure recited in claim 1, wherein the base member comprises a battery case configured to accommodate a battery.

4. The vehicle lower structure recited in claim 1, wherein positions at which the slope device is fastened to each of the rear flange of the front reinforcement member and the front flange of the rear reinforcement member, and positions at which the vehicle body floor is fastened to each of the rear flange of the front reinforcement member and the front flange of the rear reinforcement member, are configured at different positions from each other in the vehicle width direction.

\* \* \* \* \*